United States Patent [19]

von Raven et al.

[11] Patent Number: 4,486,216
[45] Date of Patent: Dec. 4, 1984

[54] METHOD FOR THE PROCESSING OF FECAL WASTE

[76] Inventors: Axel von Raven, Am Erdäpfelgarten 4, 8031 Gilching; Hans Buckl, Eberhardsweg 2, 8050 Freising-Tüntenhausen; Ulrich Kröner, Jägerstrasse 35, 8980 Ravensburg 19, all of Fed. Rep. of Germany

[21] Appl. No.: 510,307

[22] Filed: Jul. 1, 1983

[30] Foreign Application Priority Data

Jul. 7, 1982 [DE] Fed. Rep. of Germany ....... 3225454

[51] Int. Cl.$^3$ .................... C05F 3/00; C05F 13/00
[52] U.S. Cl. ................................. 71/8; 71/9; 71/10; 71/13; 210/660
[58] Field of Search .................. 71/6, 8, 9, 10, 11, 71/12, 13; 210/660

[56] References Cited

U.S. PATENT DOCUMENTS 4,440,867  4/1984  Sabherwol ...................... 210/660 X Primary Examiner—Ferris H. Lander
Attorney, Agent, or Firm—William R. Price

[57] ABSTRACT

A method for the processing of fecal waste by treatment with mineral clay, characterized in that:

A. a smectite clay, enriched with aerobic and anaerobic microorganisms, specific for the digestion of fecal waste, and with plant preparations which promote the increase of said microorganisms, and lime, is allowed to digest the fecal waste; and B. an acid phosphate is added to the fecal waste treated in this manner, after addition of the enriched smectite clay and shortly before use of the treated waste as a fertilizer.

24 Claims, No Drawings

METHOD FOR THE PROCESSING OF FECAL WASTE

FIELD OF THE INVENTION

The present invention relates to a method for the processing of fecal waste.

BACKGROUND OF THE INVENTION

According to the present invention, fecal waste refers to solid and liquid excrement of every type, for example, manure-urine mixtures with and without interspersion, such as accumulates with the large-scale handling of domestic animals. Such fecal waste is usually very inhomogeneous, since strong suspended layers, or also, however, solid top layers, often form, whereby the transport to and the deposition on agriculturally used areas, which is very desirable because of the nutrients contained therein, leads to further difficulties. Fecal waste burdens the environment with a strong, rank, and long-lasting odor. Further, in the case of fecal decay, such as usually occurs during storage, a large number of materials strongly toxic to roots develop in considerable amounts, of which the exact compositions and interactions are still not known in particular. These decomposition products probably include phenolic compounds (from blood and gall), lignin components, decomposition products of albumen (amino acids and amines), as well as organic acids (e.g., butyric acid, propionic acid). One substance strongly toxic to plant roots is probably also ammonium carbonate, which results from the decomposition of urinary materials.

The stoppage and impairment of root growth caused by these substances reduces the capacity of the plants to absorb nutrients so strongly that fecal substances are generally considered as erratic and unreliable fertilizing agents in agriculture; their reactions are calculated only with difficulty, since they depend greatly on temperature, dampness, the condition of the soil, etc.

Further, fecal waste, especially in liquid form, can be used only with great disadvantages in green areas:

firstly, because the green plant parts and the root systems of flat-rooting plants are damaged, and further, because grazing animals requiring green food refuse food fertilized in this way.

For that reason, fecal waste is generally not used during the vegetation period, but rather after the end of the vegetation period in the fall or the winter. This sort of practice, however, has the disadvantage that an uncontrollable nitrification of the ammonium nitrogen occurs, since the nitrate nitrogen formed outside of the vegetation period cannot be absorbed by the plants, and goes into the ground water with rain or melted snow. Thus, the fall and winter use of fecal waste on large agricultural areas represents today one of the most important factors in the contamination of ground water with nitrate and organic components. Furthermore, potassium is washed out and phosphate is set in the soil as tricalcium phosphate.

Finally, the untreated fecal waste contains slimy substances which obstruct the fine pores of the soil, whereby the soil's receptive capability is impaired. The fecal matter can, with intensive fertilization, get into the surface water and contaminate it, not least of all with pathogenic germs.

DESCRIPTION OF THE PRIOR ART

It has already been attempted to eliminate the unpleasant odor by the addition of substances which lead to the destruction of microorganisms which are responsible for the development of the odor. Moreover, substances are known which can temporarily mask the odor of the fecal waste.

Moreover, substances are known that have the task of conserving the ammonium nitrogen in the fecal waste, i.e., of checking the nitrification, in order to reduce in this way its washing away outside of the vegetation period. One such substance is, for example, dicyandiamide.

Further, decomposition additions, such as clays, ground primary rock, limes, mixtures of clay and mineral oils, iron sulfate, etc., are known. The substances are added to the fecal matter with the goal of promoting the conversion thereof, in the sense of decomposition.

With the help of these various additions, particular problems can be solved or reduced. A solution of all problems, however, is not possible.

Thus, the substances bring a beneficial result to the environment through the reduction of the odor, but burden the usable treatment and processing of the fecal matter with additional costs, without improving the worth as fertilizing material. The addition of dicyandiamide prevents a premature nitrification and therewith an easier leaching during the non-vegetation period. The problem of extreme toxicity to the roots could not previously be removed in this way. To be sure, through this measure, there is a greater nitrogen reservoir in the ground at the disposal of the existing plants at a given time. However, the necessary stimulation of root growth, for the better utilization of the supply of nitrogen, fails because the fecal waste treated in this way causes great damage to the roots.

Further, the known decomposition additions lead to a certain reduction of the odor as well as to an insignificant improvement of the growth. In principle, however, they do not have the desired effect, since they always absorb only a portion of the possible damaging substances, but leave a further large portion not taken into account.

Thereupon, it is seen that, until today, no useful process is known in agricultural practice that would be able to process and decontaminate fecal waste so that the nutrients contained therein can be fully used in agricultural production.

The invention deals with the problem of finding a process for the preparation of fecal waste for use as fertilizer, so that with the help of this process the previously described problems can be solved or largely reduced. In particular, with the process according to the invention, the fecal waste is so far processed and decontaminated that the nutrients contained therein can be used in the optimum way by the plants.

SUMMARY OF THE INVENTION

The subject of the invention is a method for processing fecal waste by treatment with mineral clay, characterized in that:

A. a smectite clay enriched with fecal-specific anaerobic and aerobic microorganisms and with plant preparations promoting the growth of these microorganisms, as well as with lime, is allowed to initiate decomposition of the fecal waste; and B. an acid phosphate is added to the fecal waste treated in this manner shortly before it is applied to the soil.

DESCRIPTION OF THE PREFERRED EMBODIMENT

With the help of the process according to the invention, the fecal waste is, surprisingly, processed to such a degree that it largely loses its toxicity to roots and the nutrients contained therein can be optimally used. Furthermore, unpleasant odors are eliminated. With liquified fecal matter, the homogenity and flowability required for use are improved, also when this waste contains solid components.

Preferably, the enriched smectite clay is added to the fecal waste in quantities of 0.1–20 kg/m$^3$, preferably 0.5–10 kg/m$^3$.

The smectite clay enriched with the fecal-specific anaerobic and aerobic microorganisms and with plant preparations required for the increase of these microorganisms, as well as with lime, suitably has a proportionately high specific surface area, in order to give the microorganisms a large-surfaced nutritive medium, so that a very high concentration of microorganisms per unit area is maintained. The smectite clay preferably has a specific surface area of about 400–800 m$^2$/g. The specific surface area is determined by the glycol method as follows:

A clay sample is saturated with ethylene glycol and the ethylene glycol is distilled in a high vacuum, whereby either the pressure drop in the system or the weight loss of the sample is recorded as a function of time. When the curve reaches a plateau after a short time, a monomolecular layer of ethylene glycol is present on the sample. The weight of the sample is determined, as well as the weight difference between it and the original, i.e., not saturated with ethylene glycol, sample. The surface area of the sample is then calculated using the space required by an ethylene glycol molecule. The method is described in particular in Dyal, R. S. u. Hendricks, S. B.: Total Surface of Clays in Polar Liquids as a Characteristic Index. Soil Science 69,421–432 (1950).

The smectite mineral clay includes the actual smectites (bentonites) as well as generally all the minerals of the montmorillonite-beidellite-series. These minerals are characterized by a high expansion capacity in water as well as by a high cation-exchange capacity. According to the invention, a montmorillonite clay is preferably used as the smectite clay, especially bentonite.

The function of the smectite clay as a carrier substance for the microorganisms can be improved by using a smectite clay enriched with trace elements required for the growth of the microorganisms. Suitable trace elements are, for example, iron, boron, manganese, copper, etc. These trace elements can be present in the smectite clay in the form of their salts. Due to the good cation-exchange capacity of this clay, the trace elements adhere relatively quickly to the clay and are not easily washed out by liquid fecal waste, whereby the microorganisms are provided with the necessary trace elements over a longer period of time. The type of trace element used depends on the demand of the respective microorganisms used.

Smectite clays which are additionally enriched with amorphous lime and, in the given case, with phosphate, have proven to be especially suitable.

The fecal-specific microorganisms are anaerobic and aerobic. According to the invention, the smectite clay is enriched with microorganisms of the spore-forming, small coryneform bacteria, micrococcus, and/or streptococcus types. The enrichment of the clay with the microorganisms can be effected in a simple manner, whereby the microorganisms are mixed with the clay either in a mixed culture or on a specific nutritive medium with further nutritive substances which are necessary for the growth of the microorganisms.

In addition to the microorganisms, the smectite mineral clay used contains also plant preparations required for the growth of the microorganisms. These can be added as dry preparations or as dry or liquid extracts. The plant preparations can be obtained from the entire plant, or from parts of the plant, such as leaves, flowers, stems, and bark. Especially suitable are dry preparations or dry or liquid extracts of medicinal plants or of parts of these plants. Preferably used as the medicinal plants or their parts are stinging nettles, dandelion, valerian, yarrow, camomile, or oak bark.

The smectite clay enriched with the microorganisms and the plant preparations bring about a reduction of odor by the destruction of the odorific substances with the help of the microorganisms as well as by the adsorption of the odorific substances on the surface or in the pores of the smectite clay. Further, the microorganisms break down the high-molecular substances (e.g., cellulose, slimy materials, and lignin) contained in the fecal waste. The low-molecular decomposition products resulting from this deccomposition (e.g., phenols, acids, ammonia) are probably adsorbed intermediately on the surface or in the pores of the smectite clay, so that the activity of the microorganisms is not impaired by these substances and further decomposition is not hampered. With the use of fecal waste treated in this manner, no further toxicity to roots is observed. Further, the flowability of the fecal waste is increased with the decomposition of the high-molecular organic substances, which in liquid fecal waste, are found primarily in the floating layer and in the settled solids. Further, through the addition of a smectite clay to the liquid fecal waste, a thixotropic mixture is reached, whereby the separation caused by suspended solids is hindered and, in this way, the pumpability is improved.

The treatment of the fecal waste with the enriched smectite clay is preferably carried out for a time period of 2 weeks to 6 months, especially 1–3 months, whereby this time period depends on the temperatures used. These generally lie in the range of about 5°–30° C.

The ammonia formed by the processing is probably predominantly in the form of ammonium carbonate, since carbon dioxide is also formed with the decomposition of fecal waste. The strong toxic effect to roots is partially due to ammonium carbonate. Surprisingly, it was found that, with the addition of acidic phosphate shortly before the application to the soil the toxicity of fecal matter to roots can be once more strongly reduced. This is probably due to the fact that the acidic phosphate has no more opportunity to react with the calcium or magnesium ions contained in the fecal waste in a favored competing reaction. There is no advantage in adding the acid phosphate from the beginning along with the enriched smectite clay to the untreated fecal waste, since, firstly, the ammonia concentration is probably not yet sufficiently high to react competitively with the calcium and magnesium ions and with the acidic phosphate. Also, it is not favorable to add the acidic phosphate to the fecal matter a long time before use, since the bound ammonium ions can be free again into the form of ammonia through an exchange reaction with the calcium and magnesium ions and the phosphate then precipitates as insoluble calcium- or magnesium triphosphate and therefore is no longer available for a reaction with the ammonium carbonate.

The acid phosphate is suitably added in a quantity of about 0.1–20 kg/m$^2$. Preferably, a calcium phosphate decomposed with mineral acids, such as sulfuric acid and/or phosphoric acid is used as the acid phosphate, said calcium phosphate being also described as a superphosphate. This phosphate usually contains some excess acid, through which a part of the ammonia in the pretreated fecal waste is bonded in the form of the corresponding ammonium salts. Sulfuric acid is used to decompose the neutral calcium phosphate, so that calcium sulfate, in the form of gypsum, is also formed along with the superphosphate.

This gypsum can lead to the formation of clumps when exposed to water. According to the invention, it is therefore proposed to use the superphosphate with an addition of smectite clay, whereby a smectite clay is preferably used that is also used in the first step of the process. The superphosphate is preferably finely ground with the smectite clay. In this way, the gypsum is held in suspension in the liquified fecal waste.

The addition of smectite clay is also favorable with other acidic phosphates, since it brings about a stronger binding of ammonia, as well as an additional reduction of odor and adsorption of substances toxic to roots.

Preferably, the acidic phosphate is added to the pretreated fecal waste, at the earliest, one week before its use.

The process according to the invention is illustrated through the following examples:

EXAMPLE 1

150 m$^3$ of crusted liquid manure was put into a round storage tank with 30 kg of a bentonite preparation, which was produced as follows:

1 part by weight of calcium bentonite from Moosburg/Bavaria (specific surface area 630 m$^2$/g) was mixed with 0.01 parts by weight of a preparation of liquid-manure-specific microorganisms (chiefly of the spore-forming, small coryneform bacteria, and micrococcus types), which had been cultivated on manure crust as a nutrient medium, as well as 0.01 parts by weight of a powdered mixture of dried stinging nettles, yarrow, dandelion, valerian, and camomile, and with 0.01 parts by weight of a mixture of algoid lime and tricalcium phosphate. The bentonite already had a proportionately high content of trace elements (B, Mn, Co, Cu, Mo, Ni, Zn), so that no further trace elements had to be added to promote the growth of the microorganisms.

After the bentonite preparation had worked on the crusted liquid manure for three months, the waste was processed to such a degree that the still-present floating manure crust could be eliminated after 10 minutes by stirring with the jet of a manure pump without it reforming after the stirring was stopped.

In contrast, the untreated crusted liquid manure had to be stirred for 60 minutes before the crust was temporarily eliminated; it reformed after the stirring was stopped.

The liquid manure pretreated with the bentonite preparation was mixed with 750 kg of an acid phosphate that had been obtained by grinding 90 parts by weight of a calcium phosphate, hydrolyzed with sulfuric acid, said calcium phosphate having a content of 16 wgt.% of free acid (superphosphate), and 10 parts by weight of bentonite. The product was a fine white powder easily dispersed in water without the formation of clumps.

The stirring of the phosphate preparation took place with the filling of the liquid manure truck immediately before use. Once more, a reduction in odor was hereby noted.

The liquid manure treated in this way was used on green land in a quantity of 40 m$^3$/ha (Trial A). In comparison, the same quantity was used on green land of the liquid manure treated only with the bentonite preparation (Trial B), and of untreated, 3 month-old liquid manure (Trial C).

With the use of the untreated liquid manure, a contamination and a clumping of the grasses was observed because of the solids present in the liquid manure. The liquid manure oozed very slowly and had an unpleasant odor. The liquid manure treated with the bentonite preparation (Trial B) produced a smaller degree of contamination of the grasses and penetrated the soil more easily. The unpleasant odor was less significant.

The liquid manure treated with the bentonite preparation and with the phosphate preparation (Trial A) developed a weaker odor than in Trial B. However, Trial A's contamination of the grasses and penetration of the soil was about like Trial B.

After 4 weeks, the green surfaces were mowed and the following results were noted:

| Trial A | | Trial B | | Trial C | |
|---|---|---|---|---|---|
| yield/ha (dt) | | yield/ha (dt) | | yield/ha (dt) | |
| fresh | dried | fresh | dried | fresh | dried |
| 272.2 | 40.6 | 247.7 | 34.9 | 229.0 | 28.5 |

Further, the root penetration of the top soil layer (10 cm) was qualitatively determined by cutting out a square piece of sod with a side length of 20 cm from every trial field. In Trial C, the piece of sod fell apart immediately upon being cut out. In Trial B, the piece of sod remained intact upon being cut out, but fell apart when it was allowed to fall to the ground from a height of 1 m. The piece of sod in Trial A remained intact with the same handling.

EXAMPLE 2

2 g of the bentonite preparation of Example 1 was allowed to work for one month on 1 liter of swine liquid manure. The following phosphate preparations (about 5 g) were stirred into the liquid manure treated in this manner:

Trial A1: 90 parts by weight superphosphate (decomposed with $H_2SO_4$), with 10 parts by weight finely crushed bentonite;

Trial A2: 90 parts by weight double superphosphate (decomposed with $H_3PO_4$), with 10 parts by weight finely crushed bentonite;

Trial A3: 90 parts by weight diammonium hydrogen phosphate mixed with 10 parts by weight of bentonite.

About 15 minutes after the addition of the phosphate preparations, the liquid manure samples were diluted with water in a ratio of 1:29 and divided onto Petri dishes (volumes 10 ml). The liquid surfaces were covered with soft filter papers. About 10 cress seed grains were spread on the paper surfaces. The root formation was determined after 4 days. This trial gives an indication of the toxicity of the liquid manure prepared according to the invention to the roots.

In comparison, cress seeds were allowed to germinate on correspondingly diluted liquid manure samples, whereby, in one case, liquid manure treated only with the bentonite preparation (Trial B), and in the other case, completely untreated, 3month-old liquid manure (Trial C) were used.

The following results were obtained:

|  | Trial A1 | Trial A2 | Trial A3 | Trial B | Trial C |
|---|---|---|---|---|---|
| number of germinated seeds | 9 | 9 | 8 | 6 | 5 |
| average lengths of the main roots (cm) | 5,0 ± 0,3 | 5,5 ± 0,3 | 4,9 ± 0,3 | 1,0 ± 0,2 | 0,5 ± 0,2 |
| formation of fine root hairs | strong | strong | strong | insignificant | none |

The results show that the liquid manure treated according to the invention (Trials A1-A3) is practically non-toxic to roots, since the highly sensitive root hairs grew very thickly. The liquid manure treated only with the bentonite preparation (Trial B) brought out, to be sure, a certain growth of the main roots; however, its toxicity to roots is so strong that practically no root hairs formed. The untreated liquid manure (Trial C) is so toxic to roots that even the growth of the main roots and the germination capacity were strongly reduced.

We claim:

1. A method for processing fecal waste for use as a fertilizer, which comprises the steps of:
   A. mixing said fecal waste with a smectite clay enriched with:
      1. microorganisms specific for the digestion of fecal material,
      2. vegetable nutrients for said microorganisms,
      3. lime, and
   B. thereafter adding an acidic phosphate to the fecal waste shortly prior to the application to the soil of the treated fecal waste as a fertilizer.

2. A process, as defined in claim 1, in which the enriched smectite clay is added to the fecal waste in quantities of about 0.1-20.0 kg/m³.

3. A process, as defined in claim 2, in which the enriched smectite clay is added to the fecal waste in quantities of from 0.5-10 kg/m³.

4. A process, as defined in claim 1, in which the smectite clay has a specific surface area in the range of about 400-800 m²/g, as determined by the glycol method.

5. A process, as defined in claim 1, in which said smectite clay contains montmorillonite.

6. A process, as defined in claim 1, in which said smectite clay is bentonite.

7. A process, as defined in claim 1, in which said enriched smectite clay contains trace elements which act as nutrients for the said microorganisms.

8. A method for the processing of fecal waste, as defined in claim 1, in which said microorganisms are anaerobic.

9. A method for the processing of fecal waste, as defined in claim 1, in which said microorganisms are aerobic.

10. A process, as defined in claim 1, in which said lime is amorphous in character.

11. A process, as defined in claim 1, in which said microorganisms are of the small coryneform bacteria type.

12. A process, as defined in claim 1, characterized by the microorganisms being of the micrococcus-type.

13. A process, as defined in claim 1, in which said microorganisms are of the streptococcus-type.

14. A process as defined in claim 1, in which said microorganisms are of the spore forming-type.

15. A process, as defined in claim 1, in which said vegetable nutrients include extracts of medicinal plants.

16. A process, as defined in claim 15, in which said medicinal plants include stinging nettles, dandelion, valerian, yarrow, camomile, and/or oak bark.

17. A process, as defined in claim 1, in which said acidic phosphate is added to said fecal waste in a quantity of about 0.1-20.0 kg/m³.

18. A process, as defined in claim 17, in which said acidic phosphate is added to the fecal waste in a quantity of about 1-10 kg/m³.

19. A process, as defined in claim 1, in which said acidic phosphate is prepared by decomposing calcium phosphate with a mineral acid.

20. A process, as defined in claim 1, in which said acidic phosphate is added to a smectite clay prior to being added to the fecal waste material.

21. A process, as defined in claim 1, in which said acidic phosphate comprises an acidic superphosphate finely crushed with a smectite clay.

22. A process, as defined in claim 1, in which the enriched smectite clay is allowed to digest the fecal waste for a period in the range of from 2 weeks to 6 months.

23. A process, as defined in claim 22, in which the enriched smectite clay is allowed to digest the fecal waste for a period of 1 to 3 months.

24. A process, as defined in claim 1, in which the acidic phosphate is added to the treated fecal waste not more than 1 week prior to the application to the soil of said treated waste as a fertilizer.

* * * * *